US012681565B2

(12) United States Patent
   Ohkawa

(10) Patent No.: US 12,681,565 B2
(45) Date of Patent: Jul. 14, 2026

(54) INFORMATION PROCESSING APPARATUS CAPABLE OF PROPERLY CONTROLLING VIRTUAL OBJECT, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Shuichi Ohkawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/176,889

(22) Filed: Apr. 11, 2025

(65) Prior Publication Data
    US 2025/0321632 A1     Oct. 16, 2025

(30) Foreign Application Priority Data
   Apr. 16, 2024     (JP) ................................. 2024-066099

(51) Int. Cl.
    *G06F 3/01*          (2006.01)
(52) U.S. Cl.
    CPC .................................. *G06F 3/011* (2013.01)

(58) Field of Classification Search
    None
    See application file for complete search history.

(56) References Cited

U.S. PATENT DOCUMENTS

| | | | |
|---|---|---|---|
| 2016/0132130 A1* | 5/2016 | Lu .......................... | G06F 3/0346 |
| | | | 345/659 |
| 2021/0173471 A1* | 6/2021 | Johnson ................ | G06F 3/0346 |
| 2021/0272329 A1 | 9/2021 | Katsumata | |

FOREIGN PATENT DOCUMENTS

| | | |
|---|---|---|
| JP | 2016110319 A | 6/2016 |
| JP | 2016177748 A | 10/2016 |
| JP | 2017054320 A | 3/2017 |

* cited by examiner

*Primary Examiner* — Christopher J Kohlman
(74) *Attorney, Agent, or Firm* — Canon U.S.A., Inc. IP Division

(57)          ABSTRACT

An information processing apparatus that displays an image of a virtual space on a display device worn or held by a user. A controller performs determination of whether or not the user is lying down and performs control to display the image of the virtual space on the display device. The control of a virtual object included in the virtual space is changed based on a result of the determination.

20 Claims, 7 Drawing Sheets

FIG. 2

|  | POSITION INFORMATION | ATTRIBUTE INFORMATION |
|---|---|---|
| OBJECT 1 | POSITION 1 | A |
| OBJECT 2 | POSITION 2 | B |
| ... | ... | ... |
| OBJECT N | POSITION N | A |

*FIG. 5A*

RESTRICTION OF ROTATION AT
TIME OF USER LYING DOWN

◎ ON         ○ OFF

*FIG. 5B*

RESETTING OF SCREEN POSITION
AT TIME OF USER LYING DOWN

◎ ON         ○ OFF

OBJECT ATTRIBUTE
◉ WORLD COORDINATE SYSTEM
◯ LOCAL COORDINATE SYSTEM
◯ CAMERA COORDINATE SYSTEM

INFORMATION PROCESSING APPARATUS CAPABLE OF PROPERLY CONTROLLING VIRTUAL OBJECT, METHOD OF CONTROLLING INFORMATION PROCESSING APPARATUS, AND STORAGE MEDIUM

BACKGROUND

Field of the Disclosure

The present disclosure relates to an information processing apparatus capable of properly controlling a virtual object according to user's posture, a method of controlling the information processing apparatus, and a storage medium.

Description of the Related Art

There is known a technique for displaying an image of a virtual space on a display device worn by a user, such as a head mounted display (see e.g. Japanese Laid-Open Patent Publication (Kokai) No. 2016-110319). At least one virtual object is displayed on the display device, and a user can move the display position of each virtual object by performing a predetermined operation.

As the control for moving the display position of a virtual object according to a user's operation, there are performed e.g. control for moving a virtual object while holding the lateral sides of an image of a virtual space displayed on this display device, in parallel with the horizontal direction of a real space, and control for adjusting the display position of a virtual object in the lateral direction to the front of a user, upon the user pressing a reset button.

However, the above-described controls for moving the display position of a virtual object are the control basically assuming that the user is in a standing position, and hence in a case where the user is in a position other than the standing position, it is sometimes impossible to perform proper control. For example, in a case where a user is lying down, the horizontal direction of the real space is not uniquely determined in the vicinity of the front of the user, and hence it is impossible to perform the control based on the horizontal direction of the real space as described above. Thus, conventionally, it is impossible to properly control a virtual object according to user's posture.

SUMMARY

The present disclosure provides an information processing apparatus that is capable of properly controlling a virtual object according to user's posture, a method of controlling the information processing apparatus, and a storage medium.

In a first aspect of the present disclosure, there is provided an information processing apparatus that displays an image of a virtual space on a display device worn or held by a user, including one or more processors and/or circuitry configured to perform determination for determining whether or not the user is lying down, and perform control to display the image of the virtual space on the display device, wherein the control changes control of a virtual object included in the virtual space based on a result of determination performed by the determination.

In a second aspect of the present disclosure, there is provided a method of controlling an information processing apparatus that displays an image of a virtual space on a display device worn or held by a user, including determining whether or not the user is lying down, and displaying the image of the virtual space on the display device, wherein the control changes control of a virtual object included in the virtual space based on a result of determination performed by the determination.

According to the present disclosure, it is possible to properly control a virtual object according to user's posture.

Further features of the present disclosure will become apparent from the following description of exemplary embodiments (with reference to the attached drawings).

BRIEF DESCRIPTION OF THE DRAWINGS

FIG. 2 is a diagram showing an example of data stored in a data storage section appearing in FIG. 1.

FIGS. 5A and 5B are diagrams each showing an example of a screen displayed on a display section appearing in FIG. 1.

DESCRIPTION OF THE EMBODIMENTS

The present disclosure will now be described in detail below with reference to the accompanying drawings showing embodiments thereof. Note that the present disclosure is not limited to the above-described embodiments, but can be changed and modified within the spirit and scope of the disclosure.

Figure 1:
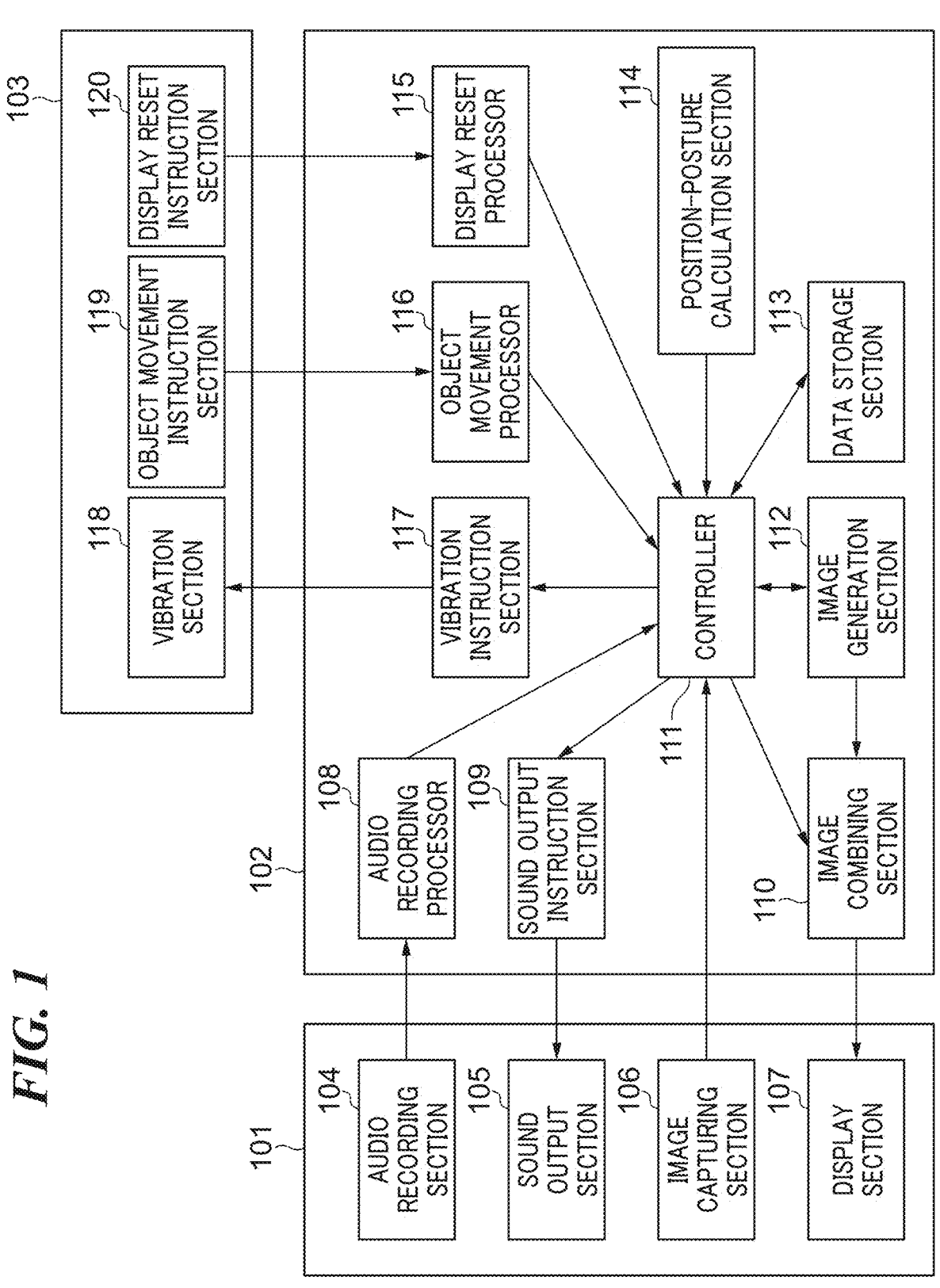
FIG. 1 is a block diagram showing an example of a configuration of an image processing system including an information processing apparatus according to the present embodiment.

FIG. 1 is a block diagram showing an example of a configuration of an image processing system including an information processing apparatus 102 according to the present embodiment. The image processing system is e.g. a mixed reality system (MR system) for causing a user to experience a mixed reality space (MR space) in which a real space and a virtual space are mixed. In the present embodiment, a description will be given of a configuration for causing a user to experience the MR space by displaying a combined image obtained by combining an image of the virtual space, which is drawn by computer graphics (CG), and an image of the real space.

This image processing system is formed by a display device 101, the information processing apparatus 102, and an operation device 103, as shown in FIG. 1. In the image processing system, the information processing apparatus 102 and the display device 101 are connected to each other in a state capable of performing data communication. Further, the information processing apparatus 102 and the operation device 103 are connected to each other in a state capable of performing data communication. Note that data communication can be performed by wired communication or wireless communication.

In the image processing system, the information processing apparatus 102 generates a combined image by combining an image of a real space, which is acquired from the display device 101, with an image of a virtual space, which is generated by the information processing apparatus 102. The information processing apparatus 102 outputs the combined image to the display device 101 as a mixed reality image (MR image). Note that in the present embodiment, the MR system that displays the MR image (image generated by combining an image of a real space with an image of a virtual space) will be described by way of example, but the image processing system of the present embodiment is not limited to the MR system. For example, the image processing system of the present embodiment can be a virtual reality (VR) system that displays only an image of a virtual space on the display device 101 or an augmented reality (AR) system that displays an image of a virtual space on the display device 101 in a state overlaid on the real space.

The display device 101 is e.g. a head mounted display (HMD). Note that although in the present embodiment, a video see-through type HMD will be described as an example of the display device 101, the display device 101 is not limited to the video see-through type HMD but can be an optical see-through type HMD. Further, the display device 101 is not limited to the HMD but can be a handheld display (HHD). The HHD is a display held by hand. That is, the display device 101 can be a display held by a user's hand, which enables a user to view an image when the user looks into the display, as performed with binoculars. Further, the display device 101 can be a display terminal, such as a tablet and a smartphone.

The display device 101 has an audio recording section 104, a sound output section 105, an image capturing section 106, or a display section 107.

The audio recording section 104 inputs e.g. sound around the display device 101 and a voice uttered by a user wearing the display device 101 (hereinafter simply referred to as "the user") as sound data and outputs the sound data to the information processing apparatus 102. The audio recording section 104 can be a directional microphone or a movable pin microphone or the like according to its use. Further, the display device 101 can include a plurality of the audio recording sections 104.

The sound output section 105 outputs sound based on the sound data output from the information processing apparatus 102. The sound output section 105 can be a speaker, an earphone, or a headphone. Further, the display device 101 can include a plurality of such sound output sections 105. In the configuration including the plurality of the audio output sections 105, each sound output section 105 can be connected to the information processing apparatus 102 by wired connection or wireless connection. Further, a device having both of the audio recording section 104 and the sound output section 105, such as a wireless earphone having a microphone function, can communicate with the display device 101 or the information processing apparatus 102.

The image capturing section 106 continuously captures an image of the real space on a time-series basis and outputs the captured images of the real space (captured images) to the information processing apparatus 102. The image capturing section 106 can include a stereo camera formed by two cameras fixed to each other to make it possible to capture an image of the real space in a sight line direction of the user.

The display section 107 displays the MR image output from the information processing apparatus 102. The display section 107 can include two displays arranged in association with right and left eyes of a user, respectively. In such a configuration, an MR image for the left eye is displayed on the display associated with the left eye of the user, and an MR image for the right eye is displayed on the display associated with the right eye of the user.

The operation device 103 has a vibration section 118, an object movement instruction section 119, and a display reset instruction section 120. The operation device 103 is an operation device for a video game, which can acquire e.g. a value corresponding to a tilting direction of a stick and a value indicating a pressed state of a button. However, the operation device 103 is not limited to an operation device held by a user's hand, such as the operation device for a video game, but can be an operation device attached to e.g. the user's body or hand. The operation device 103 can be e.g. a ring-shaped (finger-ring shaped) device which can be attached to a user's finger. Further, the operation device 103 can include a plurality of buttons and can incorporate an optical trackpad (OTP). In a case where the operation device 103 incorporates the OTP, the user can adjust a pointer to a desired item by putting a finger on the OTP and rubbing the OTP in a desired direction. Then, when the user pushes in a button of the OTP, the user can perform a determination operation e.g. for determining selection of a virtual object (virtual object), such as a menu item. Further, in a state in which the user has selected a virtual object, the user can also move the object by pointing another place, twisting a selected arm or finger, or performing an operation determined in advance.

The vibration section 118 vibrates to give a vibration sensation to a user according to a vibration instruction received from a vibration instruction section 117 of the information processing apparatus 102. To give a vibration sensation, a vibration element short in response time is desirable. As the vibration element, for example, a piezo element can be used, but any other suitable vibration element, such as a linear vibrator (LRA) and an eccentric motor (ERM), can be used.

The object movement instruction section 119 outputs a value corresponding to a user's operation (a value corresponding to a tilting direction of a stick and a value indicating a pressed state of a button) to an object movement processor 116 as operation information. Note that the movement of the object mentioned here can be not only simple parallel movement of the virtual object, but also include a variety of affine transformation, such as rotation/enlargement/reduction.

The display reset instruction section 120 outputs a display reset instruction to a display reset processor 115 according to a user's operation (an operation of pressing a button or an operation detected by a sensor of e.g. the OTP).

Note that the operation device 103 can include not only the vibration section 118, the object movement instruction section 119, and the display reset instruction section 120, but also a position-posture calculation section, not shown. The position-posture calculation section calculates (acquires) a position-posture (position and posture) of the operation device 103 in a world coordinate system in the virtual space. Note that the world coordinate system is a coordinate system equivalent to the real space to which a user belongs. In the present embodiment, the position of the virtual object in the virtual space is determined based on the position of the user and a predetermined axial direction.

The position-posture calculation section outputs information on the calculated position-posture to the object movement processor 116. The position-posture calculation section has, for example, a sensor for calculating the position-posture of the operation device 103 (such as an angular speed sensor, an acceleration sensor, or a geomagnetic sensor). Note that the position-posture calculation section can have a plurality of sensors. Further, the position-posture calculation section can be equipped with an image capturing section and a captured image processor and calculate the position-posture of the operation device 103 by performing a simultaneous localization and mapping (SLAM) processing based on feature points of a captured image.

Further, the position-posture calculation section can calculate the position-posture of the operation device 103 in a state interlocked with an optical sensor arranged in the real space. Note that the position-posture calculation section can calculate not both of values of the position component and the posture component, but either of these values. Further, the position-posture calculation section can output values for calculating the position-posture of the operation device 103 (values output from the sensor), an image, and so forth, to the information processing apparatus 102, and a position-posture calculation section 114 of the information processing apparatus 102 can calculate the position-posture of the operation device 103.

The information processing apparatus 102 includes an audio recording processor 108, a sound output instruction section 109, an image combining section 110, a controller 111, an image generation section 112, a data storage section 113, the position-posture calculation section 114, the display reset processor 115, the object movement processor 116, and the vibration instruction section 117.

The position-posture calculation section 114 calculates the position-posture of the image capturing section 106 in the world coordinate system. Specifically, the position-posture calculation section 114 extracts markers allocated to the world coordinate system from an image of the real space, which has been captured by the image capturing section 106. Then, the position-posture calculation section 114 calculates the position-posture of the image capturing section 106 in the world coordinate system based on the position-postures of the extracted markers. Then, the position-posture calculation section 114 stores information (position-posture information) indicating the calculated position-posture of the image capturing section 106 in the data storage section 113 via the controller 111.

Further, the position-posture calculation section 114 calculates the position-posture of the operation device 103 in the world coordinate system by using the information on the position-posture of the operation device 103, which is acquired from the position-posture calculation section (not shown) of the operation device 103 or the image of the real space, which has been captured by the image capturing section 106. At this time, depending on a calculation method used by the position-posture calculation section (not shown) of the operation device 103, a difference (error) can be generated between the calculated position-posture of the operation device 103 and the actual position-posture. For example, in a method of calculating the position-posture by using a combination of an angular speed sensor, an acceleration sensor, and a geomagnetic sensor, there is a case where the position-posture having an error, which is different from the actual position-posture, is calculated due to accumulation of errors of the sensors. Alternatively, in this method, there is a case where the position-posture of the operation device 103 cannot be calculated. Further, in a method of calculating the position-posture by using an optical sensor arranged in the real space, there is a case where the optical sensor is blocked by another real object, and as a result, the position-posture having an error, which is different from the actual position-posture, is calculated. Alternatively, in this method as well, there is a case where the position-posture cannot be calculated.

In such cases, by extracting markers attached to the operation device 103 from the image of the real space, which has been captured by the image capturing section 106, the position-posture calculation section 114 can calculate the position-posture of the operation device 103 with high accuracy based on the position-postures of the markers. At this time, the position-posture calculation section 114 can use all or part of results of calculation of the position-posture, which are acquired from the position-posture calculation section (not shown) of the operation device 103. However, the calculation method used by the position-posture calculation section 114 is not limited to the method using the markers, but can be a calculation method performed by the SLAM processing. Further, the posture can be detected by a posture sensor section (not shown) of the display device 101. The posture sensor section (not shown) of the display device 101 has an inertial measurement unit (IMU) and outputs information on the posture (posture information) of the display device 101 to the information processing apparatus 102.

The position-posture calculation section 114 stores the information on the calculated position-posture of the operation device 103 in the data storage section 113 via the controller 111.

In a case where an image of the operation device 103 does not appear in an image of the real space, which has been captured by the image capturing section 106, the position-posture calculation section 114 calculates the position-posture of the operation device 103 based on a value acquired from the position-posture calculation section (not shown) of the operation device 103. At this time, the position-posture calculation section 114 can calculate the position-posture of the operation device 103 based on the value acquired from the position-posture calculation section (not shown) of the operation device 103 and other information. For example, in the case where the operation device 103 does not appear in the image of the real space, if the operation device 103 is equipped with e.g. an acceleration sensor, the position-posture calculation section 114 can calculate the position-posture of the operation device 103 based on a result of detection performed by this acceleration sensor and the like. For example, the position-posture calculation section 114 can calculate the current position-posture of the operation device 103 based on the position of the operation device 103 at a time point in the past, at which the operation device 103 appears in an image of the real space, and an amount of movement of the operation device 103 from this time point, which is calculated from the acceleration. Note that in the case where the operation device 103 does not appear in the image of the real space, the position-posture calculation section 114 can detect only the posture of the operation device 103, or there can be a case where the position-posture calculation section 114 cannot calculate the position-posture of the operation device 103.

The controller 111 controls the overall operation of the information processing apparatus 102. The controller 111 controls, for example, the position-posture of a user interface (UI) (graphics) to be displayed on the display section 107, based on the information on the position-posture of the operation device 103, which is stored in the data storage section 113. Note that the position of the UI is indicated e.g. by three-dimensional coordinate information based on the orthogonal coordinate system of three axes of an X-axis, a Y-axis, and a Z-axis. As the three-dimensional coordinate information, the display of the position of the UI can be based on a polar coordinate system. In a case where the UI is a virtual ray of light (ray) irradiated from a user's hand, the position of the UI refers to e.g. a start point or end point of the ray. Further, the posture of the UI corresponds to a direction of the UI in the three-dimensional virtual space. In a case where the UI is a ray, the posture of the UI corresponds to a direction in which the ray extends. Note that although in the present embodiment, a configuration in which the controller 111 controls the position-posture of the UI to be displayed on the display section 107, based on the information on the position-posture of the operation device 103, will be described, this is not limitative. For example, the controller 111 can control the position-posture of the UI to be displayed on the display section 107, based on the information on the position-posture of the image capturing section 106, which is stored in the data storage section 113. Alternatively, the controller 111 can control the position-posture of the UI to be displayed on the display section 107, based on both of the information on the position-posture of the operation device 103 and the information on the position-posture of the image capturing section 106.

The controller 111 reads out the information on the position-posture of the image capturing section 106, which is recorded in the data storage section 113 in advance, and changes the control of the virtual object included in the virtual space based on the information on the position-posture of the image capturing section 106. The control of the virtual object is e.g. operation control for operating a virtual object. For example, in a case where it is determined, based on the information on the position-posture of the image capturing section 106, that the user is lying down, the controller 111 performs control to restrict rotation of this virtual object.

Here, for example, if the user is in the standing position, even when the display device 101 is slightly tilted, it is possible to properly rotate the virtual object based on the horizontal direction of the real space, and hence the virtual object can be automatically rotated. On the other hand, in a case where the user is lying down, the horizontal direction of the real space is not uniquely determined in the vicinity of the front of the user, and hence it is impossible to properly rotate the virtual object based on the horizontal direction of the real space. Therefore, in the present embodiment, in the case where the user is lying down, the controller 111 restricts rotation of the virtual object.

Further, the controller 111 acquires sound source data from the data storage section 113, combines the sound source data as required, and outputs the sound based on the sound source data from the sound output section 105 of the display device 101. When controlling the overall operation of the information processing apparatus 102, the controller 111 can perform the control according to a voice command. In this case, the controller 111 analyzes voice data acquired from the audio recording section 104 via the audio recording processor 108 and performs, if the voice data is a voice command, the control according to the contents of the command.

Further, in a case where a display reset instruction output from the display reset instruction section 120 is received via the display reset processor 115, the controller 111 causes the image generation section 112 to construct the virtual space by taking the position-posture into account. Thus, the controller 111 resets the display position of the virtual object which the user desires to view.

Further, in a case where an object movement instruction output from the object movement instruction section 119 is received via the object movement processor 116, the controller 111 causes the image generation section 112 to construct the virtual space in which the virtual object has been moved to a position corresponding to the object movement instruction. Thus, the movement of the virtual object is realized based on the operation of the user. Note that the virtual object to be moved is not necessarily required to be a single object, but for example, the virtual object can be a group formed by a plurality of objects.

Further, the controller 111 transmits a vibration instruction to the vibration section 118 via the vibration instruction section 117 to give a vibration sensation to the user.

Upon receipt of a display reset instruction form the display reset instruction section 120, the display reset processor 115 sends the information on the position-posture of the image capturing section 106, which is recorded in the data storage section 113 in advance, to the image generation section 112. The image generation section 112 constructs the virtual space by taking the position-posture into account, based on the acquired information on the position-posture of the image capturing section 106. Thus, the display position of the virtual object which the user desires to view is reset to e.g. a position in front of the user in the virtual space. In resetting of the display position, the user can designate a virtual object, whereby the display position of only the designated virtual object can be reset. Further, even when the user does not designate a virtual object, the display position of a virtual object group determined in advance can be reset. For example, the display positions of status information, a menu, and so forth, which the user desires to be always included in the field of view, can be collectively reset as a group. Note that in a case where the position of the virtual object changes in accordance with resetting of the display position, the position information of the virtual object, which is recorded in the storage section 113, is also updated via the controller 111.

The object movement processor 116 changes the position information of data associated with each virtual object, which is stored in the data storage section 113, based on operation information acquired from the object movement instruction section 119, and stores the changed position information in the data storage section 113. After that, the object movement processor 116 acquires the position information of data associated with each virtual object and the information on the position-posture of the image capturing section 106, which are stored in the data storage section 113, via the controller 111, and sends the acquired information to the image generation section 112. In the present embodiment, the controller 111 causes the image generation section 112 to construct the virtual space by taking the position-posture into account based on the acquired information to thereby move the virtual objects.

The image generation section 112 constructs the virtual space based on the data of the virtual space, which is stored in the data storage section 113. The data of the virtual space includes data associated with virtual objects as components forming the virtual space, data associated with a light source irradiating light throughout the virtual space, and so forth. Then, the image generation section 112 acquires the information on the position-posture of the image capturing section 106, which is calculated by the position-posture calculation section 114, from the data storage section 113 via the controller 111. Further, the image generation section 112 acquires the information on the position-posture of the UI, which is controlled by the controller 111, from the data storage section 113 via the controller 111. The image generation section 112 generates an image of the virtual space according to the position-posture of the image capturing section 106. At this time, the data associated with virtual objects as components of the virtual space, which is stored in the data storage section 113, includes position information and attribute information as shown in FIG. 2. In FIG. 2, the position information and the attribute information are associated with each virtual object. For example, a virtual object referred to as "object 1" is disposed in "position 1" and has attribute information of "A". In a case where the attribute information is used, the controller 111 changes the display control of the virtual object, by referring to the position-posture of the image capturing section 106 and also the attribute information. For example, in the present embodiment, attribute information indicating whether or not to restrict the movement is attached to each virtual object.

The image combining section 110 generates an MR image by combining an image of the virtual space, which is generated by the image generation section 112, with an image of the real space, which has been captured by the image capturing section 106. At this time, the image of the virtual space, which is generated by the image generation section 112, can be an image expressing the whole virtual space or an image expressing part of the virtual space. Further, the image combining section 110 can generate an MR image by affine-transforming the image or generate an MR image by allocating an image to a parametric curved surface. Then, the image combining section 110 outputs the generated MR image to the display device 101.

The data storage section 113 stores a variety of information as described above. The data storage section 113 includes a random access memory (RAM), a hard disk drive device, and so forth. Note that not only the information described as the information stored in the data storage section 113 in the above description, but also information described as the known information in the present embodiment is stored in the data storage section 113.

Further, the image processing system according to the present embodiment can use a user's hand in place of the object movement instruction section 119 of the operation device 103. In this case, the object movement processor 116 recognizes motion of a user's hand (gesture) from the image of the real space, which has been captured by the image capturing section 106. The object movement processor 116 changes, based on the recognized gesture, the position information of the data associated with each virtual object, which is stored in the data storage section 113, via the controller 111, and stores the changed position information in the data storage section 113. After that, the object movement processor 116 sends the position information of the data associated with each virtual object, which is stored in the data storage section 113, and the information of the position-posture of the image capturing section 106 to the image generation section 112. Then, the controller 111 causes the image generation section 112 to construct the virtual space by taking the position-posture into account to thereby move the virtual objects.

Next, a virtual object control process performed by the information processing apparatus 102 will be described.

Figure 3:
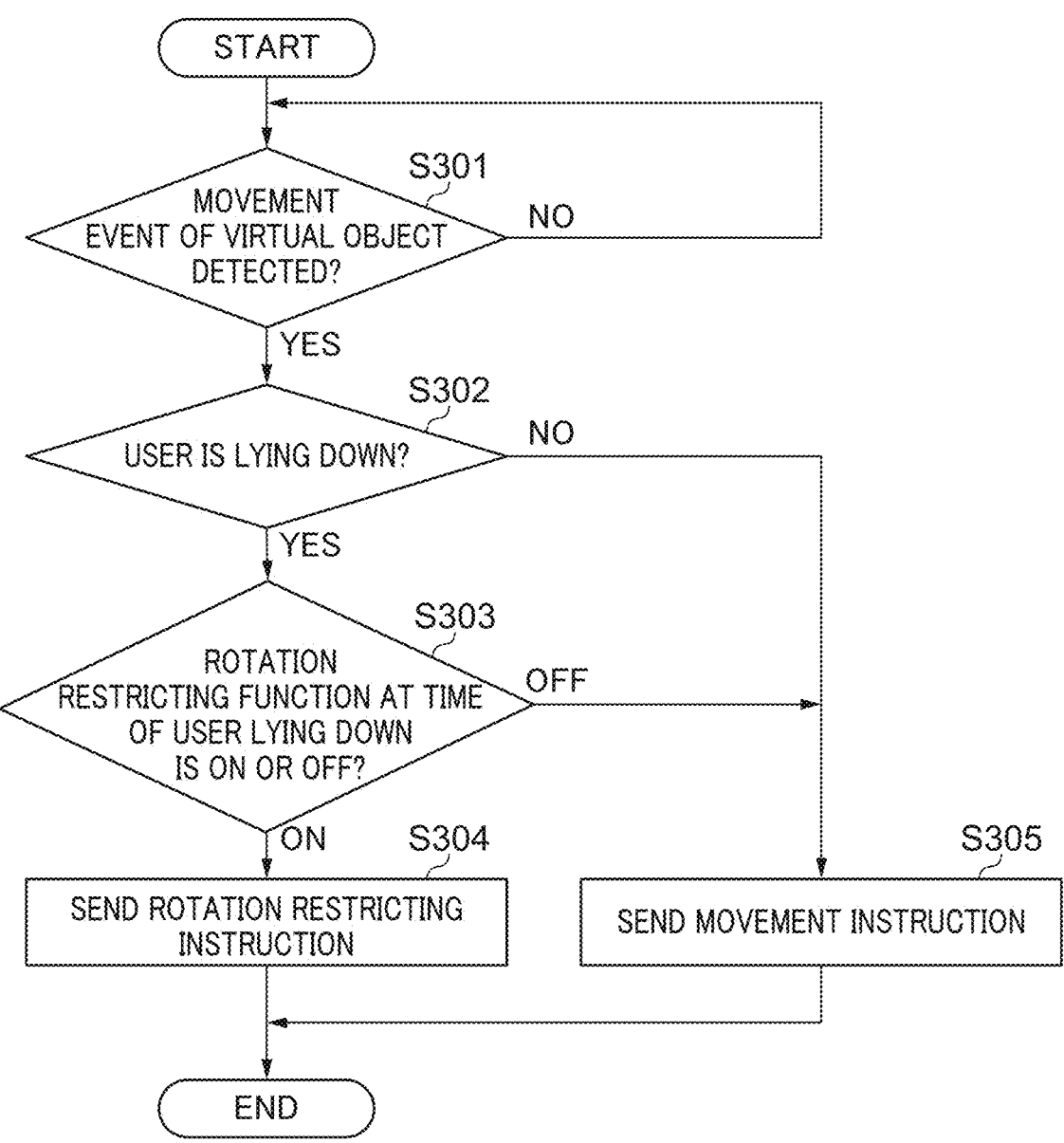
FIG. 3 is a flowchart of a virtual object control process performed by the information processing apparatus appearing in FIG. 1.

FIG. 3 is a flowchart of the virtual object control process performed by the information processing apparatus 102 appearing in FIG. 1. The virtual object control process in FIG. 3 is realized by the controller 111 that executes a program stored in the data storage section 113.

Referring to FIG. 3, first, in a step S301, the controller 111 determines whether or not a movement event of a virtual object has been detected. In the step S301, in a case where the information processing apparatus 102 has received neither a display reset instruction nor an object movement instruction from the operation device 103, it is determined that a movement event of a virtual object has not been detected, and the present process returns to the step S301. On the other hand, in a case where the information processing apparatus 102 has received a display reset instruction or an object movement instruction from the operation device 103, it is determined that a movement event of a virtual object has been detected, and the present process proceeds to a step S302. Note that, for example, in a case where an instruction for sending the information on the position-posture, which is stored in the data storage section 113, to the image generation section 112 has been received from the display reset processor 115, or reception of a display reset instruction has been notified from the display reset processor 115, the controller 111 determines that the information processing apparatus 102 has received a display reset instruction from the operation device 103. Further, for example, in a case where an instruction for changing the position information of data associated with each virtual object, which is stored in the data storage section 113, has been received from the object movement processor 116, or reception of an object movement instruction has been notified from the object movement processor 116, the controller 111 determines that the information processing apparatus 102 has received an object movement instruction from the operation device 103.

Figure 4:
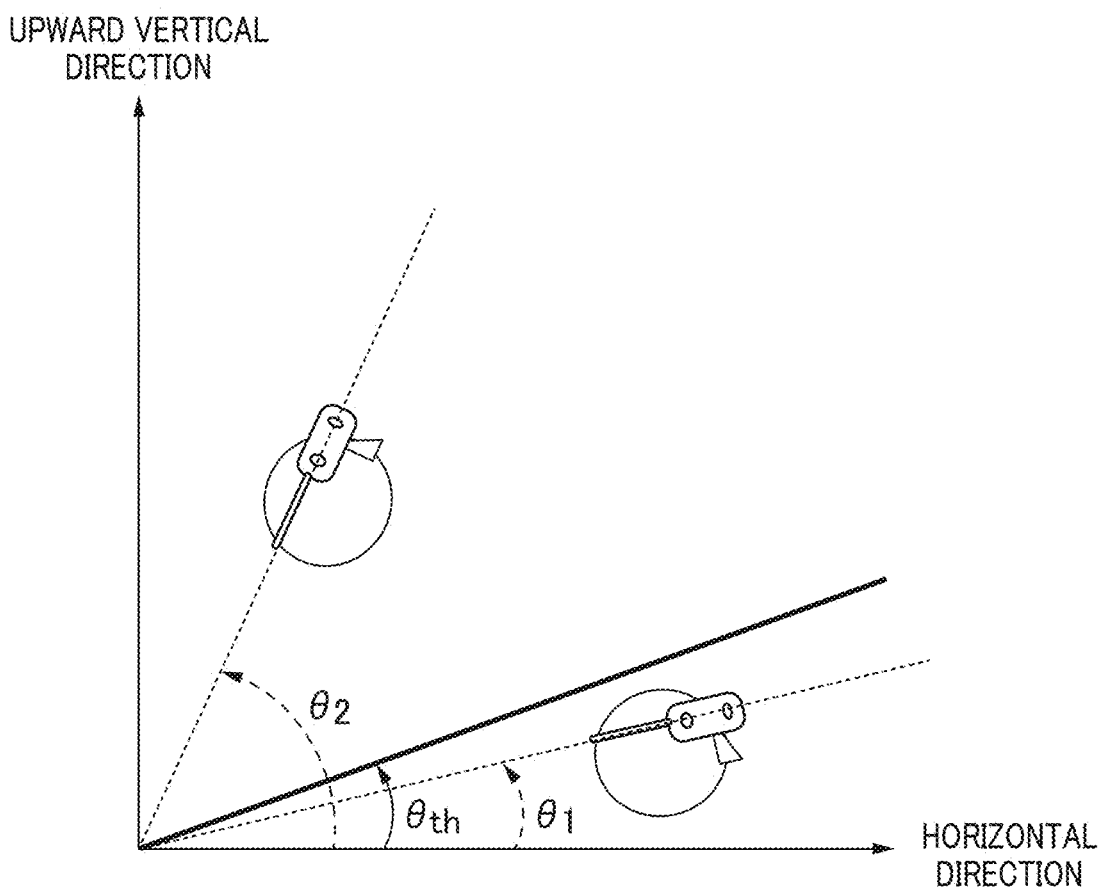
FIG. 4 is a diagram useful in explaining determination performed in a step in FIG. 3.

In the step S302, the controller 111 determines whether or not the user is lying down. In the step S302, for example, the controller 111 acquires the information on the position-posture of the image capturing section 106, which is calculated by the position-posture calculation section 114, from the data storage section 113 and determines whether or not the user is lying down, based on the acquired information of the position-posture of the image capturing section 106. For example, in a case where a pitch angle associated with the acquired information on the position-posture of the image capturing section 106 is $\theta_2$ equal to or larger than a predetermined value $\theta_{th}$, appearing in FIG. 4, it is determined in the step S302 that the user is lying down. On the other hand, in a case where the pitch angle is $\theta_1$ smaller than $\theta_{th}$, it is determined in the step S302 that the user is not lying down. Note that although FIG. 4 shows only a pitch angle range of 0 to $\theta_{th}$ degrees, and a pitch angle range of $\theta_{th}$ to 90 degrees, by way of example, angles, including a range which is not shown in FIG. 4, which are to be used for the determination of whether or not the user is lying down can be determined.

If it is determined in the step S302 that the user is lying down, the controller 111 determines whether a rotation restricting function at a time when the user is lying down is enabled or disabled (S303). In the present embodiment, the user can set the rotation restricting function at a time when the user is lying down to be enabled (ON) or to be disabled (OFF) on a setting screen shown in FIG. 5A in advance. The value set on the setting screen is stored in the data storage section 113. The controller 111 reads out the value set on the setting screen from the data storage section 113 and performs the determination in the step S303 using the read value. Note that in a case where the user has not made a setting of enabling (ON) or a setting of disabling (OFF) of the rotation restricting function at a time when the user is lying down, on this setting screen in advance, the controller 111 can read out an initial value of the system from the data storage section 113 and perform the determination in the step S303 by using the read value. Note that the rotation mentioned here refers to rotation in a roll direction out of the rotation directions of roll, pitch, and yaw.

If it is determined in the step S303 that rotation restricting function at a time when the user is lying down is enabled (ON), the controller 111 sends a rotation restricting instruction for restricting rotation of the virtual object and a movement instruction for moving the virtual object to a position corresponding to the instruction received from the user in the step S301, to the image generation section 112 (S304). The image generation section 112 having received the rotation restricting instruction and movement instruction constructs the virtual space in which the virtual objects have been moved while restricting rotation and generates the image of this virtual space. That is, even if the user attempts to move a virtual object on the three-dimensional space while rotating the virtual object in the roll direction, in the step S304, an image of the virtual space, on which rotation in the roll direction is not reflected but only the movement in the other directions is reflected is generated. After that, the present process is terminated.

If it is determined in the step S302 that the user is not lying down, or if it is determined in the step S303 that rotation restricting function at a time when the user is lying down is disabled (OFF), the present process proceeds to a step S305. In the step S305, the controller 111 sends the movement instruction for moving the virtual object to a position corresponding to the instruction received from the user in the step S301, to the image generation section 112. Note that in this movement instruction, an instruction for restricting rotation, such as the above-mentioned rotation restricting function, is not included. The image generation section 112 constructs the virtual space in which the virtual object has been moved to the position corresponding to this movement instruction and generates the image of this virtual space. After that, the present process is terminated. The image of the virtual space, which is generated by the present process, is sent to the image combining section 110. The image combining section 110 generates an MR image by combining the received image of the virtual space with the image of the real space, which has been captured by the image capturing section 106. This MR image is transmitted to the display device 101 and displayed on the display section 107.

According to the above-described embodiment, the control of the virtual object is changed based on a result of the determination on whether or not a user is lying down. This makes it possible to properly perform the control of the virtual object according to the posture of the user.

Further, in the above-described embodiment, the control of the virtual object is the operation control for operating a virtual object, and hence it is possible to properly control the operation of the virtual object according to the posture of the user.

Further, in the above-described embodiment, in a case where it is determined that the user is lying down, rotation of the virtual objects is restricted. This makes it possible to restrict rotation of a virtual object which cannot be controlled as intended by the user due to a lying-down state of the user.

Note that although in the above-described embodiment, the control for restricting rotation of the virtual objects has been described as an example of the operation control of the virtual object, this is not limitative. For example, in a case where it is determined that the user is lying down, predetermined control for moving the virtual object to a position in front of the user in the virtual space can be performed. Here, for example, in a case where there is a virtual object disposed by gravity, similar to an object in the real space, with reference to a floor surface, if the user is in the standing position, when the user slightly looks upward, it is not necessarily required to move this virtual object upward in accordance with the user. This is because it is expected that the user soon returns the visual line to the front. On the other hand, in a case where the user is lying down, if the virtual object is left disposed in the vicinity of the floor surface, this virtual object is not displayed on the display device 101, and the convenience can be impaired. To prevent this, in the present embodiment, in a case where it is determined that the user is lying down, the display position of the virtual object is moved upward, i.e. moved to a position in front of the user in the virtual space. This enables the user to easily view the virtual object in the lying state.

Figures 5A, 5B:
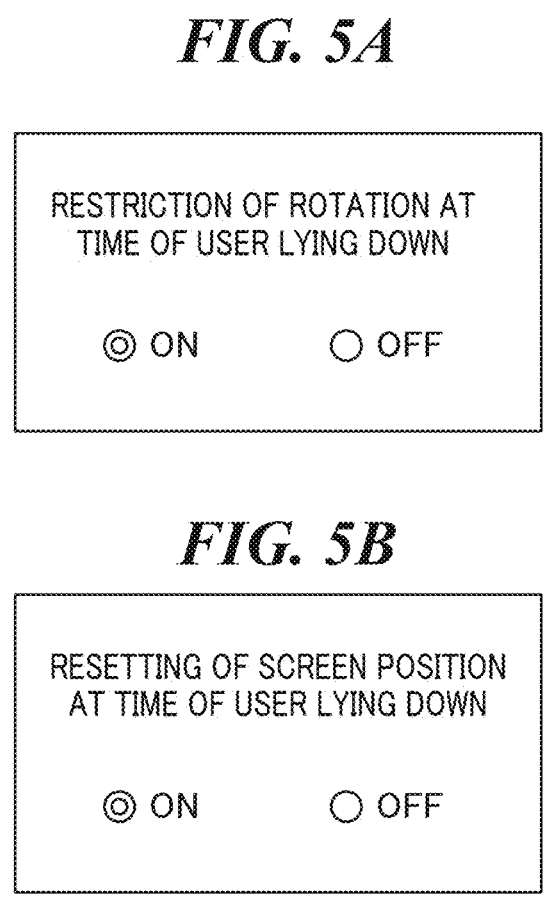

Note that in the present embodiment, the configuration can be such that the user can make a setting of enabling the above-described predetermined control (ON) or a setting of disabling the same (OFF), on the setting screen shown in FIG. 5B, in advance. With this, it is possible to reflect the user's intention on the control for displaying a virtual object at a time when the user is lying down.

Further, in the present embodiment, the predetermined control is e.g. control to reset the display position of the virtual object to the position in front of the user in the virtual space according to an instruction received from the user. This enables the user in the lying state to use the function of resetting the display position of the virtual object.

In the present embodiment, the virtual object control is not limited to the operation control for operating the virtual object. For example, the virtual object control can be display control for displaying the virtual object on the display device 101. In this display control, the coordinate system on which the virtual object is based is different between a case where it is determined that the user is lying down and a case where it is determined that the user is not lying down. For example, in the case where it is determined that the user is not lying down, the world coordinate system is used, whereas in the case where it is determined that the user is lying down, the camera coordinate system which is a coordinate system based on a user's viewpoint in the virtual space is used. With this, it is possible to properly control the display of a virtual object, by switching the coordinate system on which the virtual object is based, according to a user's posture.

Further, although in the above-described embodiment, the configuration that does not reflect rotation in the roll direction at all in the step S304 has been described, this is not limitative. For example, control to dull the rotational angle, compared with a time when rotation is not restricted, can be performed. In this configuration, a rotational angle obtained by simply dividing an original rotational angle by a predetermined value can be reflected, or alternatively, by setting a predetermined angle as a maximum angle of the rotational angle in advance, the rotational angle can be controlled to be reflected if the rotational angle is not larger than the maximum angle, and not to be reflected if the rotational angle exceeds the maximum angle.

Further, in the present embodiment, the method of limiting rotation can be changed according to a position of the target virtual object on the three-dimensional space. For example, the control is performed such that the degree of limitation of rotation is made smaller when the virtual object is in the vicinity of the front of the user and that the degree of limitation of rotation is made larger as the virtual object is farther from the front of the user can be performed.

Further, in the present embodiment, based on attribute information given to a virtual object, whether or not to restrict rotation of this object and a degree of restriction of rotation can be controlled. In this configuration, the image generation section 112 can read the attribute information of the target virtual object from the data storage section 113 via the controller 111. Alternatively, the controller 111 can read the attribute information of the target virtual object from the data storage section 113, converts the attribute information to other information indicating whether or not to restrict rotation of the object and a degree of restriction of rotation, and send the other information to the image generation section 112. Upon receipt of the attribute information or other information, the image generation section 112 generates an image of the virtual space, in which the virtual object has been moved according to the received information.

Further, in the present embodiment, the attribute information can be information indicating the coordinate system on which the virtual object is based. In such a configuration, for example, as indicated by a setting screen shown in FIG. 6A, the user can select and set the coordinate system on which the virtual object is based, out of the world coordinate system, the local coordinate system, and the camera coordinate system. This makes it possible to reflect user's intention with respect to the coordinate system on which the virtual object is based.

Figures 6A, 6B:
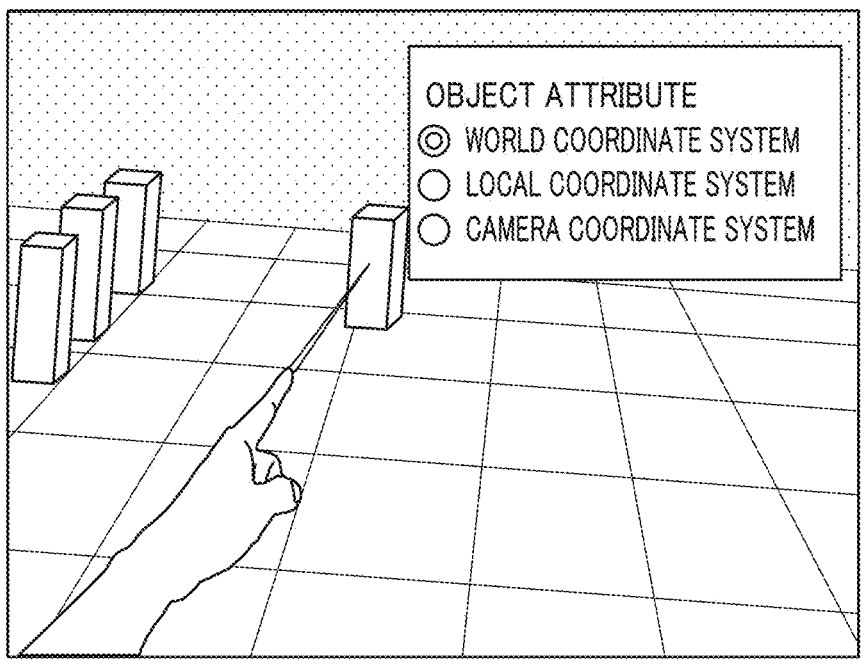
FIGS. 6A and 6B are diagrams each showing an example of a setting screen for setting a coordinate system based on which a virtual object is displayed in the present embodiment.

Further, in the present embodiment, the configuration can be, for example, such that, as shown in FIG. 6B, the user can select a target virtual object, call a setting menu of the selected virtual object, and set a coordinate system based on which the virtual object is positioned, by selecting from this setting menu. In such a configuration, the attribute information of the virtual object is set in advance in the MR space, and the user can change the set attribute information, on an as-needed basis. Further, depending on a virtual object, the attribute information which cannot be changed can be given to the virtual object. In a case where the virtual object to which the attribute information is given is selected by the user as shown in FIG. 6B, a setting menu for changing the attribute information of the virtual object is not displayed. Note that at this time, it is preferable to notify the user that the setting menu for changing the attribute information cannot be displayed. As the notification method, for example, a message indicting this fact is displayed on the display section 107, a voice indicating this fact is output from the sound output section 105, or vibration is given to the user by the vibration section 118.

Further, in the present embodiment, the attribute information can be information indicating whether or not the influence of gravity is received.

Figure 7:
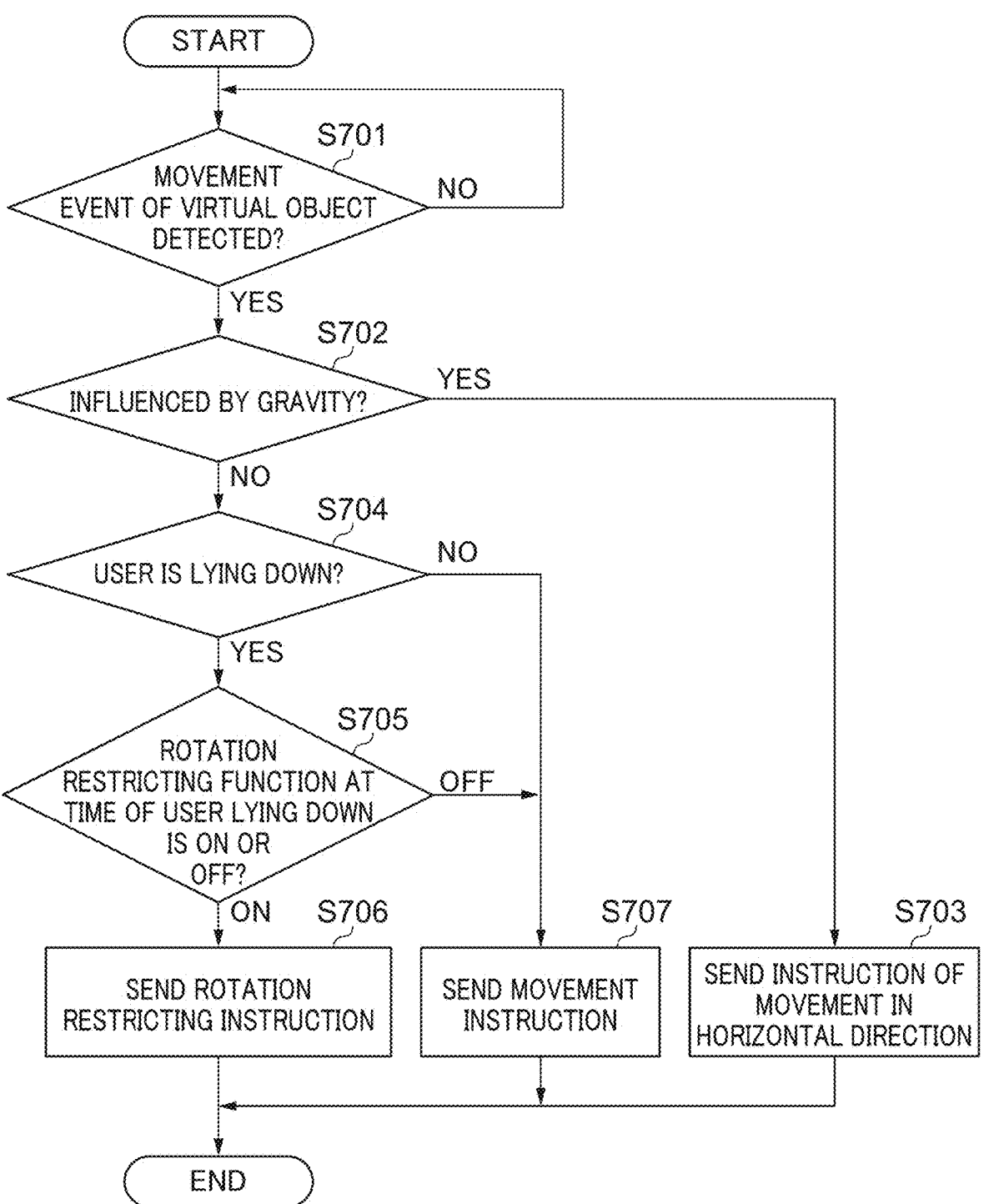
FIG. 7 is a flowchart of a variation of the virtual object control process performed by the information processing apparatus appearing in FIG. 1.

FIG. 7 is a flowchart of a variation of the virtual object control process performed by the information processing apparatus 102 appearing in FIG. 1. Note that the virtual object control process in FIG. 7 is a process similar to the above-described virtual object control process in FIG. 3, and the following description will be given, specifically, of different points from the virtual object control process in FIG. 3. Similar to the above-described virtual object control process in FIG. 3, the virtual object control process in FIG. 7 is also realized by the controller 111 that executes a program stored in the data storage section 113.

Referring to FIG. 7, first, a step S701 which is the same processing as the step S301 is executed. When a movement event of the virtual object has been detected (YES to the step S701), the controller 111 determines whether or not the virtual object to be moved is influenced by gravity (S702). Specifically, the controller 111 reads the attribute information of this virtual object from the data storage section 113 and determines, based on the read attribute information, whether or not this virtual object is influenced by gravity. Here, a configuration will be described in which a virtual object influenced by gravity is inhibited from being vertically moved from the original position.

If it is determined in the step S702 that the virtual object to be moved is influenced by gravity, the present process proceeds to a step S703. In the step S703, the controller 111 sends a movement instruction on which, out of instructions received from the user in the step S701, only a movement instruction in the horizontal direction is reflected, to the image generation section 112. For example, in a case where the user tilts the HMD slightly upward, the image generation section 112 constructs the virtual space in which the virtual object is moved to a position corresponding to the movement instruction in the horizontal direction out of the instructions received from the user in the step S701 but is not moved in the vertical direction, and generates an image of the virtual space. With this, it is possible to prevent an unnatural image of the virtual space, such as an image in which the virtual object to be naturally arranged according to gravity floats in the air, from being generated. After that, the present process is terminated. The image of the virtual space, generated by the present process, is sent to the image combining section 110. The image combining section 110 generates an MR image by combining the received image of the virtual space with the image of the real space, which has been captured by the image capturing section 106. This MR image is transmitted to the display device 101 and displayed on the display section 107.

If it is determined in the step S702 that the virtual object to be moved is not influenced by gravity, steps S704 to S707, which are the same processing operations as the above-described steps S302 to S305, are executed, followed by terminating the present process.

Note that although in the above-described virtual object control processes in FIGS. 3 and 7, the description has been given of the configuration in which in a case where a movement event of a virtual object has been detected (YES in S301 or S701), the virtual object control is changed based on whether or not the user is lying down, this is not limitative. For example, it can be also considered that the user simply views upward or lies on the back in a state wearing the HMD without providing an instruction for moving the virtual object. In such a case as well, how to move and display the virtual object is also controlled according to the processing operations in the step S302 et seq. or the processing operations in the step S702 et seq.

Further, in the present embodiment, the configuration can be such that a movement distance is limited based on the attribute information. In such a configuration, limitation to the same distance with respect to all directions is not necessarily required to be performed, but only upward movement can be limited, or the degree of limitation can be differentiated between movement in an upward direction and movement in the other directions. The attribute information indicating such limitation can be given to each virtual object, and the behaviors of all virtual objects can be uniformly set as a system setting. Alternatively, the behavior can be changed by a system setting only with respect to a virtual object to which specific attribute information is given. For example, with respect to a virtual object to which the attribute information indicating that the virtual object is influenced by gravity is given, the upward movement is restricted by a system setting.

Further, in the present embodiment, a plurality of different attribute information can be given to each virtual object. For example, the attribute information indicating the coordinate system set in FIG. 6B and the attribute information indicating whether or not the virtual object is influenced by gravity are given to each virtual object. Note that as a method of realizing addition of a plurality of attribute information items by a small amount of data, for example, a method can be used in which the attribute information is expressed by one byte which is divided into two bits each, whereby the four attribute information items are independently expressed by one byte. Note that although the attribute information is expressed by one byte and in two bits, by way of example, it can be easily considered that the attribute information is expressed by a plurality of bytes and in another number of bits.

Further, although in the above-described embodiment, the configuration in which the information processing apparatus 102 is an apparatus separate from the display device 101 has been described, this is not limitative. For example, the information processing apparatus 102 and the display device 101 can be integrated formed, that is, the display device 101 can include the information processing apparatus 102. With this, in the configuration in which the information processing apparatus 102 and the display device 101 are integrated, it is possible to properly control the virtual object according to user's posture.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-066099 filed Apr. 16, 2024, which is hereby incorporated by reference herein in its entirety.

What is claimed is:
1. An information processing apparatus that displays an image of a virtual space on a display device worn or held by a user, comprising:
  one or more processors; and

one or more memories storing instructions when executed by the processor, cause the information processing apparatus to:
  perform determination for determining whether or not the user is lying down; and
  perform control to display the image of the virtual space on the display device,
  wherein the control changes control of a virtual object included in the virtual space based on a result of determination performed by the determination,
  wherein attribute information of the virtual object is given to the virtual object in advance, and
  wherein the control changes control of the virtual object based on the result of determination performed by the determination and the attribute information.
2. The information processing apparatus according to claim 1, wherein the control of the virtual object is display control for displaying the virtual object on the display device.
3. The information processing apparatus according to claim 2, wherein in the display control, a coordinate system based on which the virtual object is positioned, is different between a case where it is determined that the user is lying down and a case where it is determined that the user is not lying down.
4. The information processing apparatus according to claim 3, wherein the coordinate system is set by the user.
5. The information processing apparatus according to claim 1, wherein the control of the virtual object is operation control for operating the virtual object.
6. The information processing apparatus according to claim 5, wherein the control includes predetermined control for moving the virtual object to a position in front of the user in the virtual space, in a case where it is determined that the user is lying down.
7. The information processing apparatus according to claim 6, wherein the predetermined control is control for resetting a display position of the virtual object to the position in front of the user in the virtual space according to an instruction received from the user.
8. The information processing apparatus according to claim 5, wherein the control includes control for restricting rotation of the virtual object in a case where it is determined that the user is lying down.
9. The information processing apparatus according to claim 8, wherein the rotation is rotation in a roll direction.
10. The information processing apparatus according to claim 9, wherein the information processing apparatus switches whether or not to execute the control for restricting the rotation based on a user setting that enables or disables a function of restricting the rotation in a case where the user is determined to be lying down.
11. The information processing apparatus according to claim 9, wherein the control for restricting the rotation includes control for limiting a maximum value of a rotation angle in the roll direction to a predetermined angle.
12. The information processing apparatus according to claim 9, wherein the control for restricting the rotation includes control for reflecting a rotation angle obtained by dividing a rotation angle in the roll direction by a predetermined value.
13. The information processing apparatus according to claim 1, wherein the information processing apparatus is an apparatus separate from the display device.
14. The information processing apparatus according to claim 1, wherein the information processing apparatus is included in the display device.

15. The information processing apparatus according to claim 1, wherein the attribute information includes information indicating whether or not the virtual object is influenced by gravity.

16. The information processing apparatus according to claim 15, wherein the control includes, in a case where the virtual object is determined, based on the attribute information, to be influenced by gravity, movement control that reflects a movement instruction in a horizontal direction and does not reflect a movement instruction in a vertical direction, among movement instructions for the virtual object received from the user.

17. The information processing apparatus according to claim 1, wherein the determination determines whether or not the user is lying down based on whether a pitch angle corresponding to an attitude of the display device is equal to or greater than a predetermined threshold.

18. The information processing apparatus according to claim 1, wherein the changing of the control of the virtual object by the control is performed in a case where a movement event of the virtual object is detected, and wherein the movement event includes receipt of a display reset instruction from the user or receipt of an object movement instruction from the user.

19. A method of controlling an information processing apparatus that displays an image of a virtual space on a display device worn or held by a user, comprising:

determining whether or not the user is lying down; and displaying the image of the virtual space on the display device, wherein the control changes control of a virtual object included in the virtual space based on a result of determination performed by the determining, wherein attribute information of the virtual object is given to the virtual object in advance, and wherein the control changes control of the virtual object based on the result of determination performed by the determination and the attribute information.

20. A non-transitory computer-readable storage medium storing a program for causing a computer to execute a method of controlling an information processing apparatus that displays an image of a virtual space on a display device worn or held by a user, wherein the method comprises:

determining whether or not the user is lying down; and displaying the image of the virtual space on the display device, wherein the control changes control of a virtual object included in the virtual space based on a result of determination performed by the determining, wherein attribute information of the virtual object is given to the virtual object in advance, and wherein the control changes control of the virtual object based on the result of determination performed by the determination and the attribute information.

* * * * *